(12) United States Patent
Anderson et al.

(10) Patent No.: US 11,093,559 B2
(45) Date of Patent: Aug. 17, 2021

(54) INTEGRATION OF NEWS INTO DIRECT SOCIAL COMMUNICATIONS AND INTERACTIONS

(71) Applicants: Mark R. Anderson, Friday Harbor, WA (US); Scott Schramke, Shoreline, WA (US); Sally Anderson, Seattle, WA (US)

(72) Inventors: Mark R. Anderson, Friday Harbor, WA (US); Scott Schramke, Shoreline, WA (US); Sally Anderson, Seattle, WA (US)

(73) Assignee: SNS Conference Corporation, Friday Harbor, WA (US)

( * ) Notice: Subject to any disclaimer, the term of this patent is extended or adjusted under 35 U.S.C. 154(b) by 396 days.

(21) Appl. No.: 15/889,077

(22) Filed: Feb. 5, 2018

(65) Prior Publication Data
US 2018/0157756 A1    Jun. 7, 2018

Related U.S. Application Data

(63) Continuation of application No. 12/488,449, filed on Jun. 19, 2009, now Pat. No. 9,886,506.
(Continued)

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/958* (2019.01); *G06Q 10/10* (2013.01); *G06Q 50/01* (2013.01)

(58) Field of Classification Search
CPC ................ G06F 16/9535; G06F 1/163; G06F 16/24578; G06F 1/00; G06F 3/00; G06F 3/0482; G06F 16/29; G06F 16/9024; G06F 16/9554; G06F 19/00; G06F 1/1694; G06F 21/44; G06F 21/46; G06F 2203/011; G06F 2203/0384; G06F 3/011; G06F 3/012;
(Continued)

(56) References Cited

U.S. PATENT DOCUMENTS 6,490,579 B1    12/2002  Gao et al.
7,634,546 B1 *  12/2009  Strickholm ............ G06Q 10/10
                                                        709/205

(Continued)

*Primary Examiner* — Yicun Wu
(74) *Attorney, Agent, or Firm* — Davis Wright Tremaine LLP

(57) ABSTRACT

The integration of news about members of a group into symmetrical group communications is described. Group members are delivered news items and information regarding members of the group, and are able to communicate with other members of the group in response to the news items. One embodiment dynamically generates aggregated RSS news feeds for a group of people or entities and correlates that aggregated data with biographical information, audio, and video media to provide rich information about the relevant parties to the news story. The embodiment also provides the capability of transmitting email or other electronic messages to the parties in the news story to facilitate two-way communication while maintaining the group members' privacy and anonymity.

20 Claims, 9 Drawing Sheets

Related U.S. Application Data

(60) Provisional application No. 61/074,109, filed on Jun. 19, 2008.

(51) Int. Cl.
*G06F 16/958* (2019.01)
*G06Q 10/10* (2012.01)
*G06Q 50/00* (2012.01)

(58) Field of Classification Search
CPC .......... G06F 3/013; G06F 3/014; G06F 3/017;
G06F 3/04817; G06F 3/04842; G06F
11/142; G06F 11/1464; G06F 11/3006;
G06F 11/302; G06F 11/3089; G06F
11/32; G06F 11/3419; G06F 11/3452;
G06F 11/3457; G06F 11/3495; G06F
15/00; G06F 16/00; G06F 16/211; G06F
16/212; G06F 16/243; G06F 16/24575;
G06F 16/248; G06F 16/25; G06F 16/28;
G06F 16/287; G06F 16/313; G06F
16/3322; G06F 16/355; G06F 16/90332;
G06F 16/90335; G06F 16/9035; G06F
16/9038; G06F 16/951; G06F 16/9537;
G06F 16/955; G06F 16/9577; G06F
16/958; G06F 17/11; G06F 17/18; G06F
19/3481; G06F 21/00; G06F 21/31; G06F
21/316; G06F 21/6245; G06F 2221/2103;
G06F 2221/2133; G06F 3/041; G06F
3/0481; G06F 3/04845; G06F 3/04847;
G06F 3/14; G06F 40/186; G06F 40/30;
G06F 40/40; G06F 8/34; G06F 8/36;
G06F 8/60; G06F 8/65; G06F 9/44; G06F
9/451; G06F 9/4843
See application file for complete search history.

(56) References Cited

U.S. PATENT DOCUMENTS

| | | |
|---|---|---|
| 7,669,123 B2 | 2/2010 | Zuckerberg et al. |
| 7,689,556 B2 | 3/2010 | Garg et al. |
| 7,783,622 B1 | 8/2010 | Vandermolen et al. |
| 7,827,208 B2 * | 11/2010 | Bosworth ............... H04L 67/22 |
| | | 707/802 |
| 8,499,040 B2 | 7/2013 | Schoen et al. |
| 2007/0282795 A1 | 12/2007 | Mashinsky |
| 2008/0021870 A1 | 1/2008 | Birnbaum et al. |
| 2008/0025488 A1 | 1/2008 | Dean et al. |
| 2008/0059453 A1 | 3/2008 | Laderman |
| 2008/0104679 A1 | 5/2008 | Craig |
| 2008/0162654 A1 | 7/2008 | Corfee et al. |
| 2008/0243933 A1 * | 10/2008 | Holtzman ............... G06Q 10/10 |
| 2008/0244091 A1 | 10/2008 | Moore et al. |
| 2009/0210391 A1 * | 8/2009 | Hall .................. G06F 16/24578 |
| 2009/0249244 A1 | 10/2009 | Robinson et al. |
| 2014/0136328 A1 | 5/2014 | Abhyanker |

\* cited by examiner

| ID | First | Last | Email One | Email Two | Mobile | Bio | Web Site |
|---|---|---|---|---|---|---|---|
| 1 | Jane | Doe | JDoe@foo.net | jane17@gmail.com | 312-555-1973 | Jane's Chicago office... | foo.net/about.htm |
| 2 | Bill | Jones | jones@jones.com | --- | 425-555-5678 | Bill runs a pop stand... | billjones.com |
| 3 | Richard | Brown | RickBrown@bar.org | rbrown@bar.org | 212-555-9283 | Rick started a charity... | charity.com/rick/ |
| 4 | Joe | Barnes | Joe@retailzone.com | jb@retailzone.com | 206-555-1234 | Joe is the CEO of ... | retailzone.com/jb/ |

*Fig.2A.*

| ID | Entity Name | Contact One | Contact Two | Stock Ticker | Web Site |
|---|---|---|---|---|---|
| 5 | Jones Pop Shop | jones@jones.com | mary@jones.com | JOPS | www.jones.com |
| 6 | The Bar Foundation | info@bar.org | RickBrown@bar.org | --- | www.bar.org |
| 7 | RetailZone Company, Inc. | inquiry@retailzone.com | jill@retailzone.com | REZO | www.retailzone.com |
| 8 | Foo Net | Jdoe@foo.net | --- | FOON | www.foo.net/about.htm |

| ID | Entity Name |
|---|---|
| 7 | RetailZone Company, Inc. |

404

| ID | Character Groups |
|---|---|
| 23 | RetailZone |
| 37 | Company |
| 43 | Inc |
| 47 | Co |
| 51 | REZO |

406

Keyword Cluster One

| ID | Character Groups |
|---|---|
| 23 | RetailZone |
| 37 | Company |
| 43 | Inc |

408

Keyword Cluster Two

| ID | Character Groups |
|---|---|
| 23 | RetailZone |
| 47 | Co |

410

Keyword Cluster Three

| ID | Character Groups |
|---|---|
| 23 | RetailZone |
| 51 | REZO |

RetailZone? More like RetailGROAN!
Posted by angrymunchkin on June 14, 2009, at 7:32 PM
http://www.wordpress.com/complaintblog/

For some reason, I went into my "friendly" neighborhood RetailZone today. I don't know why I even bother. All of the customers there were in a hurry, were crowded around the sales racks, and were incredibly rude to each other.

I tried to talk to a manager to see why they never stock the things that I'm looking for, and I couldn't even find one! The cashier I spoke to said he must be out having a smoke, but unless that smoke break took half an hour, I think he was hiding from me.

So, readers, is the RetailZone in your neighborhood this terrible? Let us know in the comments!

Contact Related Group Members:

Joe Barnes (RetailZone CEO)
anon1082375@stratnews.com

Stu Barnes (RetailZone Regional Manager)
anon1039235@stratnews.com

Jill Smith (RetailZone Customer Relations)
anon1382457@stratnews.com

RetailZone General Inquiry Email
anon1908244@stratnews.com

INTEGRATION OF NEWS INTO DIRECT SOCIAL COMMUNICATIONS AND INTERACTIONS

CROSS-REFERENCE TO RELATED APPLICATION

This application is a continuation of U.S. application Ser. No. 12/488,449, filed Jun. 19, 2009, entitled "INTEGRATION OF NEWS INTO DIRECT SOCIAL COMMUNICATIONS AND INTERACTIONS," which claims the benefit of U.S. Provisional Patent Application No. 61/074,109, filed Jun. 19, 2008, entitled "INTEGRATION OF NEWS INTO DIRECT SOCIAL COMMUNICATIONS AND INTERACTIONS," the disclosures of which are hereby incorporated by reference in their entirety for all purposes.

BACKGROUND

Until now, news has been a one way transmission from vendor to reader. When delivered in this format, the news fails to live up to its full potential to bring people together and help build dynamic group communication. What is needed is a change in the nature of what news is and is for, and, ultimately, a change in the relationship between the individual and society.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present application describes the integration of news about members of a group into symmetrical group communications. Group members both are delivered news items and information regarding members of the group, and communicate with other members of the group in response to those news items. One exemplary embodiment dynamically generates aggregated Really Simple Syndication (RSS) news feeds for a group of people or entities and correlates that aggregated data with biographical information, audio, and video media to provide rich information about the relevant parties to the news story. The embodiment also provides the capability of transmitting email or other electronic messages to the parties in the news story to facilitate two way communication while maintaining the group members' privacy and anonymity. As a result, news is no longer picked by someone else, and something that "happens to" you; rather, because news is about those in a group, it becomes participative and interactive.

A system for aggregating news stories and facilitating communication is provided. The system comprises a group information store configured to store information associated with one or more groups, a search parameter store configured to store search parameters based on information from the personal information store, and an aggregated news store configured to store news retrieved from one or more search engines in response to queries based on the search parameters.

In other embodiments, a computer-implemented method of adding a new group member to a group for news aggregation and communication is provided. The method comprises, under the control of instructions executed by one or more computer processors: collecting information identifying the new group member, storing the collected identification information and ancillary data in a personal information store, determining whether the new group member is acceptable as a member of the group, and, if the group member is acceptable, adding information to a group information store to associate the new group member with the group.

In other embodiments, a computer-readable medium having computer-executable instructions stored thereon that, if executed by a computer, cause the computer to perform a method for aggregating news stories relating to members of a group. The method comprises breaking a target search parameter into one or more character groups, the target search parameter based on information associated with a group member, combining one or more character groups into a keyword cluster, generating a search query tailored to a specific search engine based on the keyword cluster, and aggregating results for the search query into an aggregated news store.

DESCRIPTION OF THE DRAWLNGS

The foregoing aspects and many of the attendant advantages of this invention will become more readily appreciated as the same become better understood by reference to the following detailed description, when taken in conjunction with the accompanying drawings, wherein:

FIGS. 2A and 2B illustrate exemplary tables of information stored in the news aggregation and communication system shown in FIG. 1;

FIG. 4 illustrates examples of the types of data generated when the news aggregation and communication system shown in FIG. 1 generates search tent's;

FIGS. 8A and 8B illustrate a standard web browser displaying various embodiments of group communication techniques facilitated by the news aggregation and communication system shown in FIG. 1.

DETAILED DESCRIPTION

Group Formation and Membership

Figure 1:
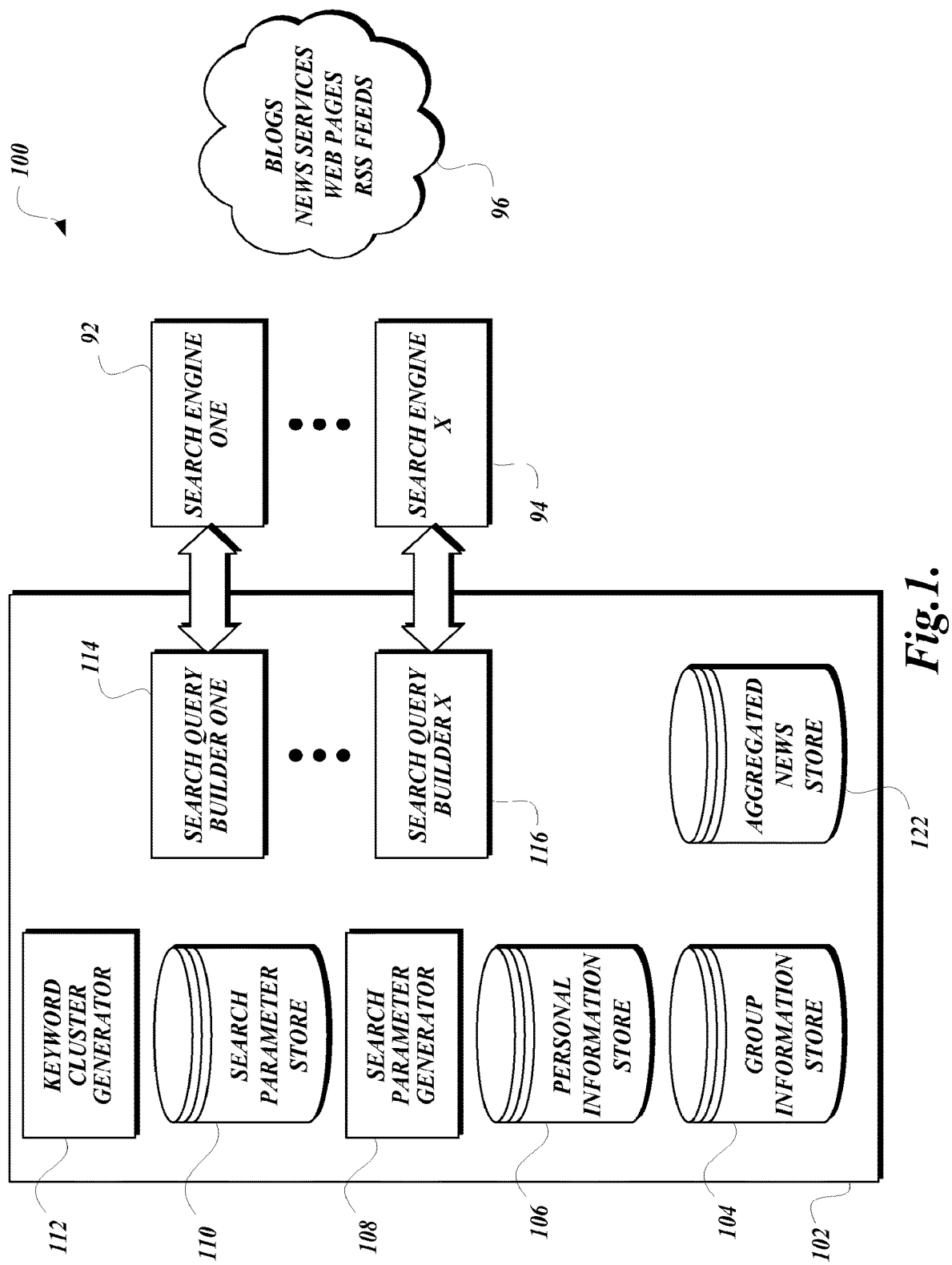
FIG. 1 is a block diagram showing an overview of a news aggregation and communication system according to various embodiments of the present disclosure.

FIG. 1 is a block diagram showing an overview of an exemplary news aggregation and communication system 100. The system 100 includes a news aggregation and communication server 102. The server 102 includes a group information store 104, a personal information store 106, a search parameter generator 108, a search parameter store 110, and a keyword cluster generator 112. These components collectively store information about groups and group members, and generate search terms based on that information. The server 102 submits the generated search terms to one or more search query builders, depicted as search query builder one 114 through search query builder X 116. Each search query builder is configured to craft a search query in a format suitable for a given external search engine such as the Yahoo!, Google, and Bing search engines, for example, depicted as search engine one 92 through search engine X 94. Using publicly available search engines allows the server 102 to utilize varying search formats to find news concerning group members from various sources, such as blogs, news services, web pages, and RSS feeds available on the internet 96. Once retrieved from these sources, the news is aggregated and stored in an aggregated news store 122.

Embodiments of the present system facilitate the distribution of news items to members of a group and enable the group members to then communicate amongst each other in response to the distributed news items. The group may be composed of any number of individual persons, business entities, etc., who have agreed to be members of the group. A group may also be added as a member of a parent group, to help streamline management of membership in the parent group. In some embodiments, a person or business entity that registers with the system may join several different groups without having to register multiple times. In some embodiments, it is also possible to establish relationships between group members. These relationships may simply indicate a social network association, but they may also indicate a more information-rich association, such as, for example, the fact that one group member (an individual) is the CEO of another group member (a business entity).

FIG. 2A illustrates one example of a set of information 200 stored about individuals (as opposed to business entities) who have joined a group. In order to join a group, a potential group member provides registration information that identifies the potential group member. For an individual, this registration information would include the person's first name 204 and last name 206. The registration information also includes contact information, such as an email address 208. Once supplied, the email address 208 can be used by the system 100 to communicate with the group member. Group members may also have multiple pieces of contact information. For example, an individual may provide an additional email address 210 and/or a mobile phone number 212 to establish additional ways the system 100 may send information to the individual. The system 100 may also store a unique identifier 202 associated with each group member.

Ancillary data about a group member may also be collected by the system. This may include, for example, biographical information 214, Web page links 216, or other information not illustrated in FIG. 2A (such as picture information, video interviews, social network connections, and so on). One reason for collecting this information is to provide other group members more detailed information about the group member. Another reason for collecting ancillary data about the group member is to provide additional information from which search terms can be gleaned to minimize the number of irrelevant news stories that are retrieved. For example, Group Member #1 ("Jane Doe") has a common name, but terms gleaned from the ancillary data (such as the city "Chicago" from her biographical information) may be used to further narrow news story searches.

FIG. 2B illustrates one example of a set of information 250 stored about business entities (as opposed to individuals) who have joined a group. An entity name 254 may be used in place of the first and last name of a person as identifying information, and one or more email addresses 256, 258 of individuals tasked with communicating on behalf of an entity may be used as contact information, such as the CEO, the public relations director, and so on. Further, an unique identifier 252 may be stored for the business entity. As with individuals, ancillary information may be stored related to the business entity, such as a stock ticker symbol 260, web site 262, and so on. In some embodiments, the registration information of a business entity may be connected with a company background document. The registration information for a business entity may be automatically extracted from a company background document, or the company background document may submitted and stored as part of the registration information.

While FIGS. 2A and 2B depict examples of information that may be stored pertaining to group members, the stored information is not limited to these examples. For example, more than two email addresses may be associated with a group member, or additional pieces of ancillary data may be stored. Further, even if an entry for a group member is not complete, the system 100 will still function for the group member. For example, the entry in FIG. 2A for Group Member #2 is lacking an entry in the Email Two 210 field, and the entry in FIG. 2B for Group Member #6 is lacking an entry in the stock ticker 260 field. The contact information may also include data not relating to e-mail, such as phone numbers, instant messaging addresses, voice or video conferencing information, chat room addresses, and the like. Given the sensitive nature of the contact information, it is generally hidden from display to other group members, even though other less sensitive registration information (such as the first and last name of the group member or the group member's picture) may be displayed to the group members.

Figure 3:
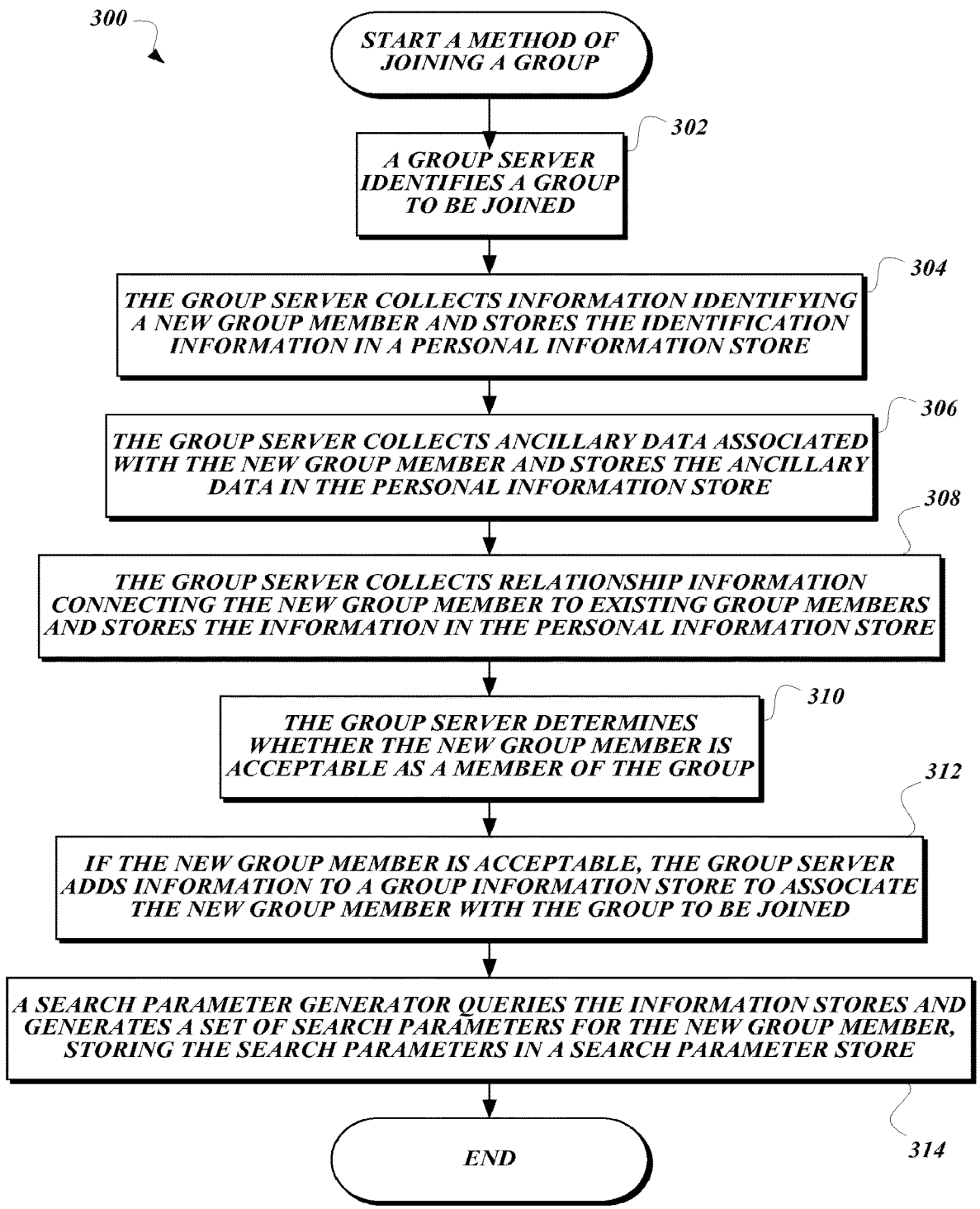
FIG. 3 illustrates a method for joining a group stored in a news aggregation and communication system according to various embodiments of the present disclosure.

FIG. 3 illustrates a method 300 by which a new group member may be joined to a group. From a start block, the method 300 proceeds to block 302, where a group server 102 identifies a group to be joined. The group to be joined may be specified by the new group member, or the group server 102 may automatically determine an appropriate group for the new group member based on information supplied by the new group member. For example, the group server 102 may choose a group for the new group member based on the stated nature of the new group member's business. The method 300 then continues to block 304, where the group server 102 collects information identifying a new group member (such as a first name and last name or an entity name) and stores the identification information in a personal information store 106. Next, at block 308, the group server 102 collects ancillary data associated with the new group member and stores the ancillary data in the personal information store 106.

The method 300 then proceeds to block 308, where the group server 102 collects relationship information connecting the new group member to existing group members and stores the relationship information in the personal information store 106. As described above, the relationship information may indicate a social network association, but may also indicate a more information-rich association, such as, for example, the fact that one group member (an individual) is the CEO of another group member (a business entity).

Participating as a member of a group includes not only receiving aggregated news stories and information concerning members of the group, but also involves consenting to receiving communications from other members of the group. Since the members of the group have agreed to receive communications from other members of the group, it is important that only trustworthy individuals are allowed to join and participate in the group, lest the group members become overwhelmed with unwanted messages. Hence, group membership may be predicated on the approval of other members of the group. This may include the approval of a group administrator, a majority vote of the rest of the group, or some similar action. Accordingly, from block 308, the method 300 proceeds to block 310, where the group server 102 determines whether the new group member is acceptable as a member of the group. As outlined above, this could happen through facilitating a vote amongst existing group members, through obtaining approval of a group administrator, and so on.

Next, the method 300 proceeds to block 312, where, if the new group member is acceptable, the group server adds information to the group information store 104 to associate the new group member with the group to be joined. The method 300 then proceeds to block 314, where a search parameter generator 108 queries the personal information store 106 and the group information store 104 and generates a set of search parameters for the new group member, storing the generated search parameters in the search parameter store 110. Examples of generated search parameters are further described below. The method 300 then proceeds to an end block and terminates.

News Aggregation

Once a group has been formed and group members have been added to the group, embodiments of the system 100 collect news stories relating to members of the group. As an overview, embodiments of the system search the Internet for news stories and blog posts relating to the members of the group, and then aggregate the retrieved news stories and blog posts for simplified presentation to the members of the group. Both the aggregation and presentation of news stories and blog posts are further described below. Some embodiments of the system execute these searches of the Internet using standard search services, such as Google, Yahoo!, MSN Search, and the like, which each provide search results in their own standardized faun in response to queries submitted in their own standardized query formats.

Embodiments of the system begin generating search parameters by retrieving target search parameters from the search parameter store 110. The search parameters in the search parameter store 110 are generated by the search parameter generator 108 in a dynamic manner, based on at least the group member information including the registration information and the ancillary data. In this way, the likelihood of search confusion (that is, the return of search results that are not relevant to the group members) is minimized. This generation of search parameters may occur when the group member information is first stored in the system 100, and may occur periodically to update the stored search parameters as additional information concerning each group member is gathered.

Each set of search parameters may then be structured into keyword clusters. Target search parameters obtained from the data source are "cleaned" or "filtered" in order to put them in a state that is more likely to generate relevant search results when submitted to a search engine. FIG. 4 shows an example wherein the entity name of Group Member #7 (FIG. 2B) is retrieved from the search parameter store 110 and used to generate keyword clusters. If the raw entity name of "RetailZone Company, Inc." was used to conduct the search, a search engine configured to find instances of each individual word would be unlikely to return relevant results due to the common nature of the waits "Company" and "Inc." Accordingly, the system 100 performs further processing on this name, such as splitting the name into separate words ("RetailZone", "Company,", and "Inc."). The system 100 may also remove punctuation from each word ("Company," would become "Company", and "Inc." would become "Inc"), to help ensure that each search engine would produce consistent results regardless of original punctuation.

The system 100 may also discard portions of the name that, if searched for alone, may return results that are not related to the company. For example, the system 100 might discard the words "Company" and "Inc", as they would be likely to return many irrelevant results due to being mentioned in many news stories that relate to companies other than the group member, but the system 100 would be unlikely to discard the word "RetailZone", as it is likely to only be used in news stories relating to the group member.

Once the system 100 has split each name into a number of character groups, a unique identifier is assigned to each character group. The result of this processing is one or more character group/ID pairs 404 based on the target search parameters. These character groups, along with their unique identifiers, are then sorted into keyword clusters. For example, all three character groups 23 ("RetailZone"), 37 ("Company"), and 43 ("Inc") may be combined into Keyword Cluster One 406.

The system 100 may create supplemental character groups and keyword clusters that are not individual components of the name of the group member. For example, the system 100 may create character groups and keyword clusters that replace portions of the group member's name with likely substitutes that may be used in a news story other than the actual name. For example, if a person's first name is Edward, the system may include an additional keyword of "Ed" or "Ted". In the example shown in FIG. 4, the system 100 has included character group 47 ("Co") as a common alternative spelling of "Company", and has created Keyword Cluster Two 408 to include the alternative.

The system 100 may also create additional character groups and keyword clusters based on other ancillary information stored about the group member. For instance, if a company is generally known by another name (such as a d/b/a name or common shortened form, such as substituting "Chevy" for "Chevrolet") and ancillary information concerning that alternate name is stored, the system 100 may include character groups and keyword clusters representing that ancillary information. In the example shown in FIG. 4, the system 100 has included character group 51 ("REZO") based on the stock ticker 260 for the group member, and has created Keyword Cluster Three 410 to include the extra character group.

The system 100 then combines these keyword clusters with search engine control variables in order to prepare queries for submission to search engines. Queries to search engines often take the form of a specially formatted URL, but may also take the form of an XML-based query, a programmatic API call, and so on. Formatting of a special URL or an XML-based query may include appending delimiter objects to each keyword cluster and concatenating the keyword clusters with each other. This may also include appending search control variables to the query string, such as an indication of the number of results to return, an indication of a specific date range to search for, an indication of explicit search operators, and the like. Embodiments of the system 100 may also include search location data with the search query string. This search location data may include the current physical location of the group member associated with the generated keyword clusters, or may correlate with another group member using the system.

After the search queries have been generated, the queries are submitted by the search query builders 114-116 to one or more search engines 92-94, either one at a time or in parallel.

The system 100 assigns a unique identifier to each result set, and ensures that each search result contains information about one or more group members. This may be limited to ensuring that the group member associated with the generated keyword clusters for which the query was generated is mentioned in each result, but may also include checking for other group members as well. Each search result is then organized into "bins" according to which group member or members it is relevant to. Once the search results have been so identified and categorized, they are stored in the aggregated news store 122 for later presentation in a variety of formats.

Figure 5:
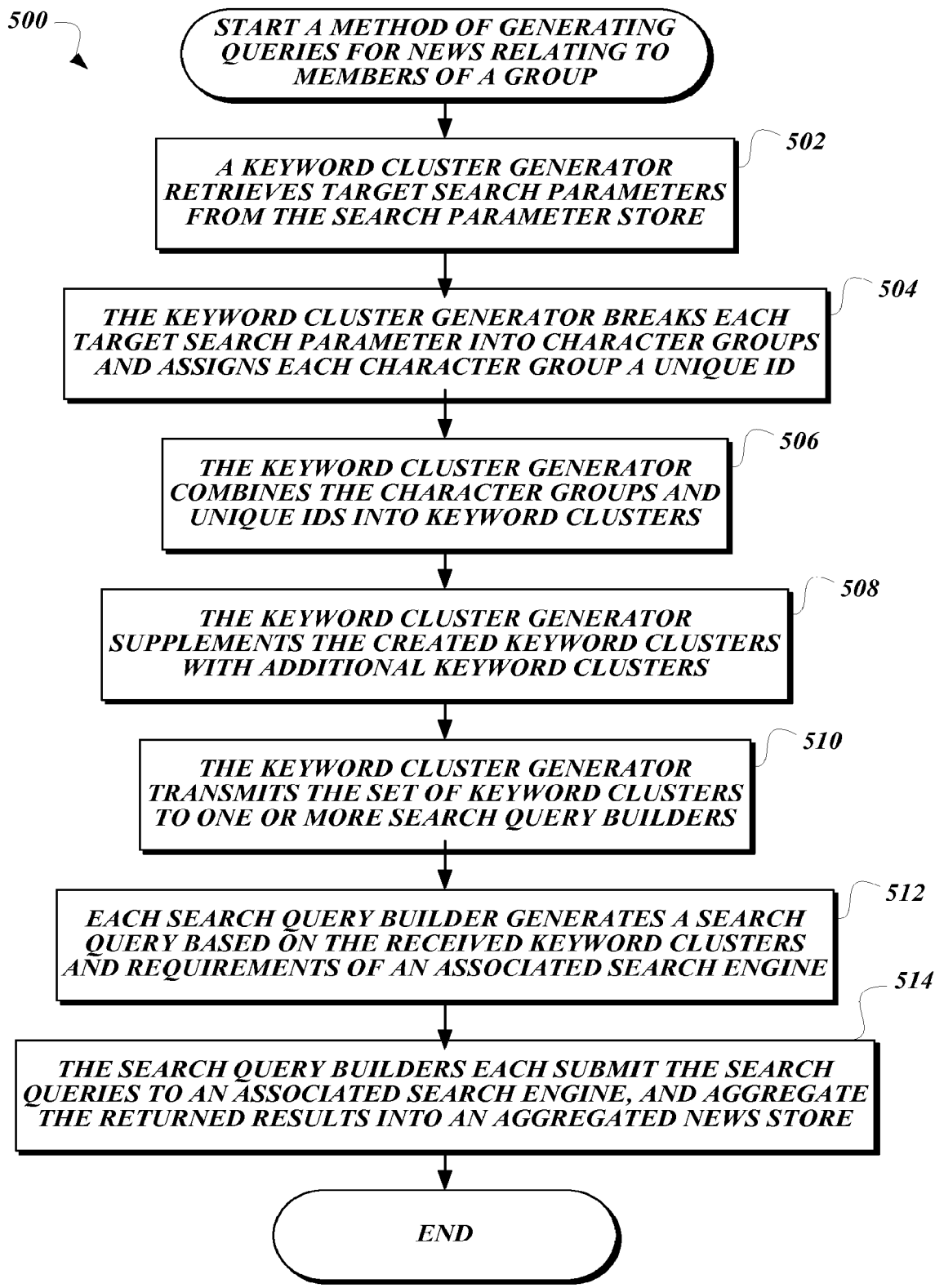
FIG. 5 illustrates a method for generating queries for news aggregation according to various embodiments of the present disclosure.

FIG. 5 illustrates a method 500 for generating queries for news relating to members of a group. From a start block, the method 500 proceeds to block 502, where the keyword cluster generator 112 retrieves target search parameters from the search parameter store 110. Next, at block 504, the keyword cluster generator 112 breaks each target search parameter into character groups and assigns each character group a unique identifier. The method 500 then proceeds to block 506, where the keyword cluster generator 112 combines the character groups and unique identifiers into keyword clusters. Next, at block 508, the keyword cluster generator 112 supplements the created keyword clusters with additional keyword clusters. The method 500 then proceeds to block 510, where the keyword cluster generator 112 transmits the set of keyword clusters to one or more search query builders 114. Next, at block 512, each search query builder 114 generates a search query based on the received keyword clusters and the requirements of the associated search engine 92. The method 500 then proceeds to block 514, where the search query builders 114 each submit the search queries to an associated search engine, and aggregate the returned results into an aggregated news store 122. Finally, the method 500 proceeds to an end block and terminates.

Displaying Aggregated News and Facilitating Intra-Group Communication

Once news stories have been generated, aggregated, and stored, they may be presented to group members in several different ways. One embodiment of the system sends a group member an aggregation of news stories relating to all of the members in the group. Another embodiment displays a list of group members, and following a link associated with a given group member will cause a display of a list of all of the stories relating to that particular group member. These group member pages may also include some of the stored ancillary information about that group member, such as the full company name, the biographical information, the picture information, and the like. The group member pages may also include data from sources other than the ancillary information or the news stories concerning the group member, such as the group member's current stock price, the weather at the location of the group member, and so on.

Figure 6:
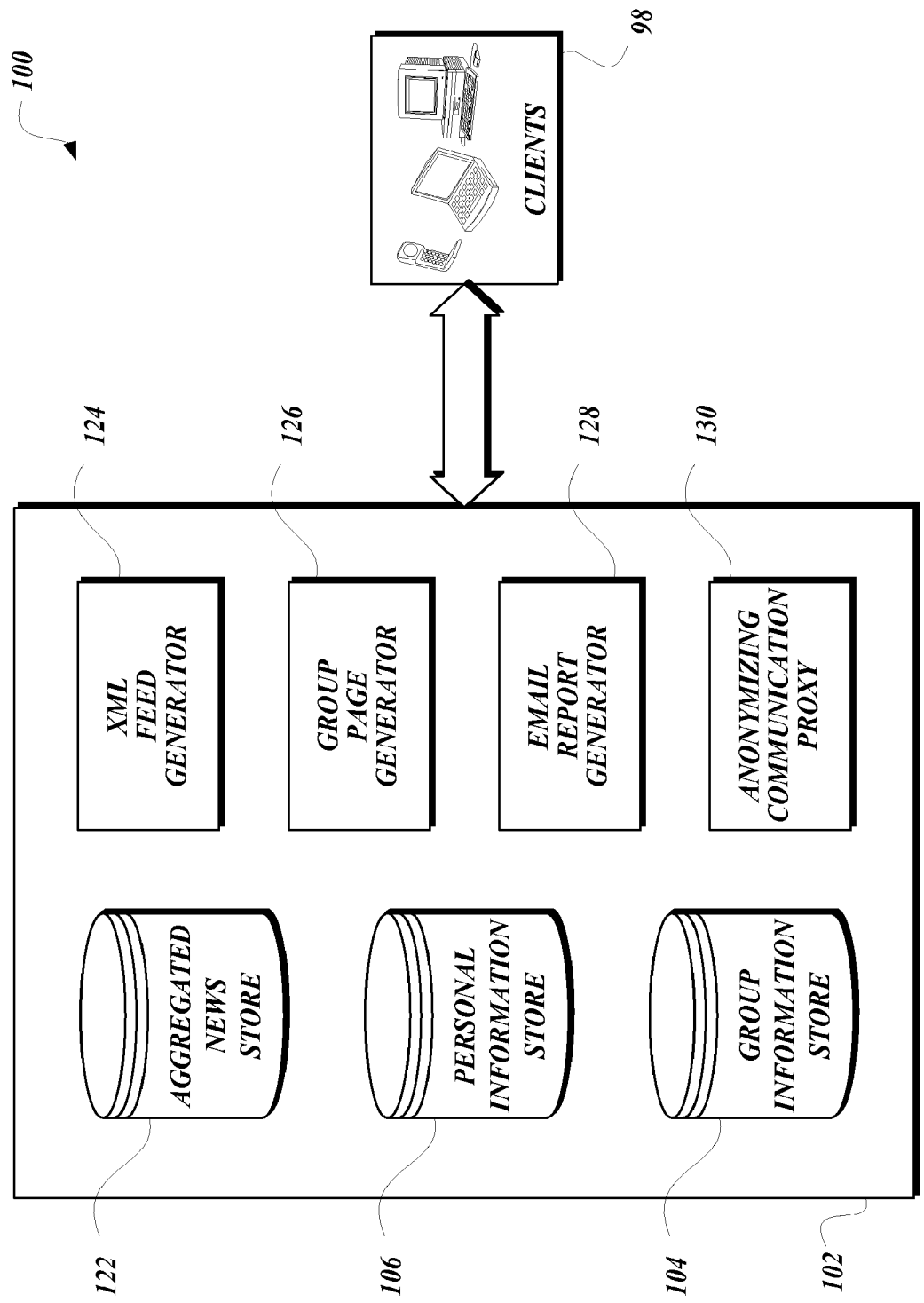
FIG. 6 is a block diagram showing further components of the news aggregation and communication system shown in FIG. 1.

FIG. 6 is a block diagram showing further aspects of the news aggregation and communication server 102 relating to the presentation of aggregated news items and the facilitation of communication between group members. Once news items have been gathered, aggregated, and stored in the aggregated news store 122, the news aggregation and communication server 102 may make these aggregated news items available to group members in several ways. As shown in FIG. 6, an XML feed generator 124 may be used to deliver aggregated group news items as an XML-formatted data feed. Also, a group page generator 126 may be used to display the aggregated group news items to group members when the group members visit a particular web page. Further, an email report generator 128 may deliver the aggregated group news items to each group member within an email message. A wide variety of client types 98 may be used to receive the aggregated group news items, including but not limited to cell phones, laptop computers, desktop computers, PDAs, and so on. In order to facilitate communication between group members while preserving group member anonymity, the news aggregation and communication server 102 also includes an anonymizing communication proxy 130.

Figure 7:
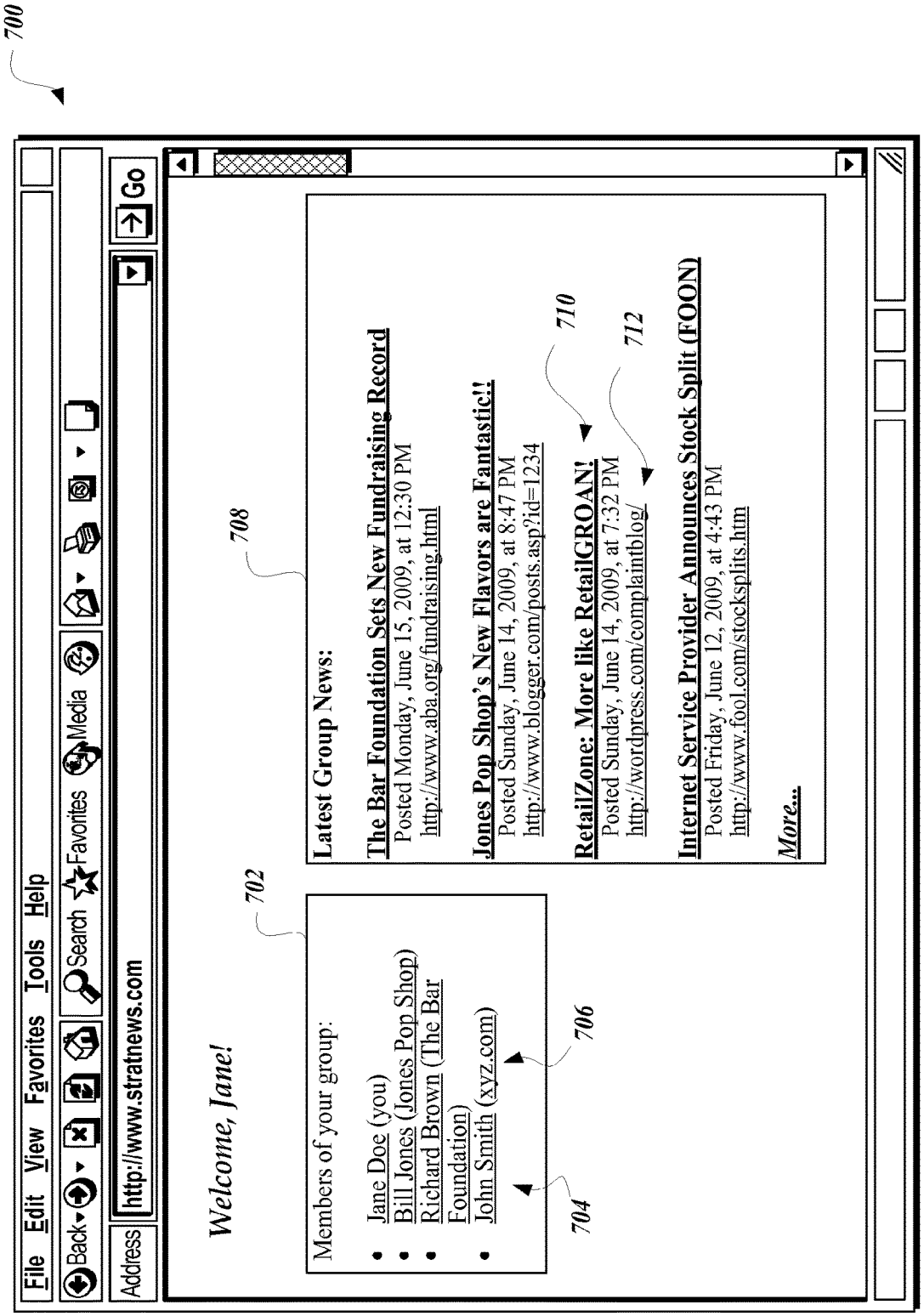
FIG. 7 illustrates a standard web browser displaying aggregated news information stored in the news aggregation and communication system shown in FIG. 1.

FIG. 7 illustrates one example of a page 700 displaying aggregated group information. This page 700 is an example of what Jane Doe (FIG. 2A) might see when she connects to the system 100. The page 700 contains a list of other group members 702. The display of each group member may include a link 704 to navigate to the group member page associated with the group member and a link 706 to the group member page of any entity associated with the group member (if available). The page 700 also contains a list of aggregated news 708. In this example, news stories relevant to each of the group members are displayed. Each news story may be accompanied by a link 712 to the original story and a link 710 to a communication page related to the news story. The communication page is described further below.

This integrated display can be presented via Web site, PDA, cell phone, or via any other communications network with client devices capable of displaying news stories and communicating responses thereto. For example, one embodiment of the system may provide a web page which a group member could connect to in order to browse the aggregation of news stories. Another embodiment of the system may provide an RSS feed containing the aggregation of news stories, and a group member would browse the aggregation using an RSS reader. Another embodiment of the system may deliver the news aggregation, or a summary thereof, to group members via e-mail.

Embodiments of the system allow the group members to communicate with one another once a group member has seen a news story relating to another member of the group. For example, if Jane Doe browses within the system and finds a listing of a story concerning RetailZone Company, Inc., Jane Doe will be able to communicate with RetailZone Company, Inc. or its CEO, if he is the focus of the news story using the system.

In some embodiments of the system, neither Jane Doe nor RetailZone Company, Inc. will be told the e-mail address of the other party, thereby ensuring the privacy and anonymity of both parties, but still allowing them to communicate with each other. The anonymity and privacy of the parties can be ensured in several ways. One embodiment of the system displays an input form in conjunction with the display of the story. The group member browsing the story would be able to enter a message into the form, and the system would deliver the message to the group member discussed in the story.

Figure 8A:
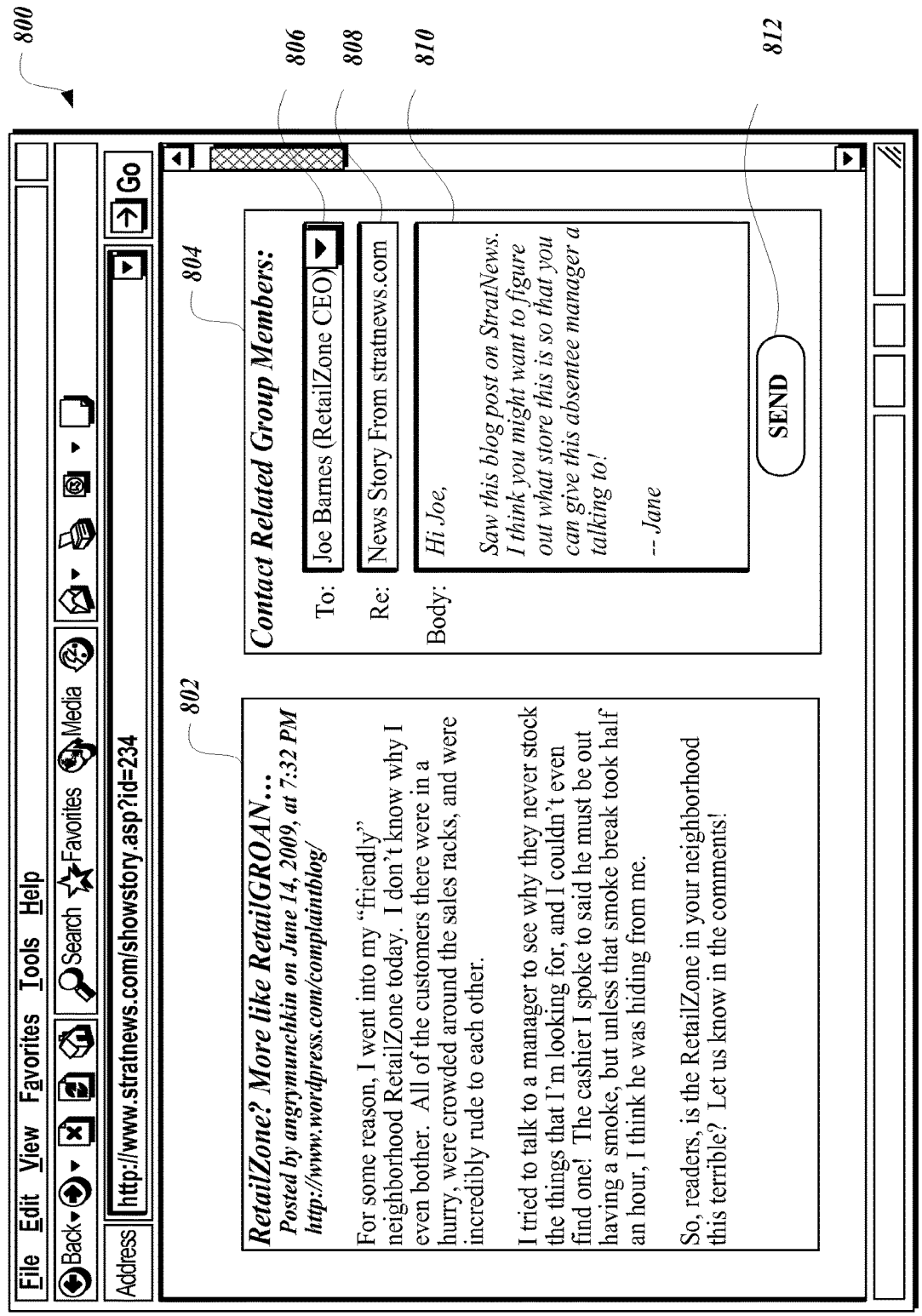

FIG. 8A illustrates one example of a page 800 that facilitates communication between group members using a form. One way a group member would reach this page 800 is by clicking on the link 710 (FIG. 7) associated with a story in a list of aggregated news stories. The page 800 contains a copy of the original story 802, along with a section 804 for enabling communication with group members related to the story 802. In this example, the section 804 contains a form for sending related group members a message. A drop-down list 806 contains a list of group members related to the story 802. These group members may be mentioned themselves in the story, or may be associated with other group members mentioned in the story. The section 804 also contains a subject line 808, text input box 810, and send button 812 for creating and sending a message to the selected group member. Through the use of this form, neither the sender nor receiver has to disclose any contact information to the other party, but the system 100 nevertheless facilitates communication between them.

Another embodiment of the system 100 automatically generates an anonymous e-mail address to be associated with each participant in the group. The anonymizing communication proxy 130 (FIG. 6) would then accept an e-mail using a standard e-mail client addressed to the automatically generated anonymous address, and would forward that anonymous e-mail to its intended recipient, based on the e-mail address provided upon joining the group.

FIG. 8B illustrates one example of a page 850 that facilitates communication between group members using automatically generated anonymous email addresses. As in the previous example, the page 850 contains a copy of the original story 802, along with a section 852 for enabling communication with group members related to the story 802. The section 852 contains a list of names 806 of group members related to the story 802, along with links 808 for sending email to anonymous email addresses associated with the group members using a standard email client. In this example, the system 100 has determined that Joe Barnes, Stu Barnes, Jill Smith, and RetailZone General Inquiry Email are all group members who are associated with the story 802. Joe Barnes registered his email address with the system as "Joe@retailzone.com" (FIG. 2A). The anonymizing communication proxy 130 automatically generated an anonymous email address of "anon1082375@stratnews.com" to be associated with Joe Barnes. When a sending user clicks the link 808 to send Joe Barnes an email, the sending user will only see the "anon1082375@stratnews.com email address. Once the anonymizing communication proxy 130 receives the email, it resolves the anonymous email address to the registered email address of the associated group member, and forwards the email to the registered email address.

This technique may also be used to allow the sending user to conceal their email address as well. The sending user may configure their email client to use a previously generated anonymous email address stored in the system 100 as the sender address, or the anonymizing communication proxy 130 may detect the identity of the sending group member and replace the sending group member's address in the email with the sending group member's associated anonymous email address.

Although a system that facilitates communication through e-mail has primarily been discussed. some embodiments are capable of supporting communication between group members via other communication media. For example. in an embodiment of the system where the group member contact information included a phone number, the system may support communication between group members via telephone. This may also include either displaying or hiding the phone numbers of the respective parties, and may also include a corresponding video feed. Other embodiments can support communication via audio or video conferencing, SMS, VoIP, instant messaging, chat, and the like.

While illustrative embodiments have been illustrated and described, it will be appreciated that various changes can be made therein without departing from the spirit and scope of the invention. As a nonlimiting example, the components and data stores illustrated may reside on the same physical device, or may be spread across multiple devices. As another nonlimiting example, the described functionality of a given component may be contained within a single component, spread across multiple components, or combined with the functionality of other components.

The embodiments of the invention in which an exclusive property or privilege is claimed are defined as follows:

1. A system, comprising:
one or more processors; and
memory storing instructions executable by the one or more processors to cause the system to:
for each member of a plurality of members, perform a method to add the member to a group of members to enable the member to receive content about other members of the group and to enable the other members of the group to receive content about the member, wherein performance of the first method comprises:
obtaining ancillary information about the member, storing the ancillary information in association with an identifier of the member;
storing information to associate the member with the group of members, and
storing a set of search parameters for the member with other search parameters for other members of the group, the set of search parameters comprising parameters specific to the member to identify content about the member;
submit queries in accordance with at least the other search parameters and the search parameters specific to individual members of the group to identify, from external sources, instances of content about members of the group including instances of content about the individual members; and
as a result of members being in the group, indicate the identified instances of content to the members.

2. The system of claim 1, wherein the method comprises performing operations to determine whether the member satisfies a set of conditions for joining the group and wherein adding the member to the group requires satisfaction of the set of conditions.

3. The system of claim 1, wherein the instructions are further executable to generate the queries by at least generating multiple keyword clusters for a search parameter.

4. The system of claim 1, wherein the instructions are further executable to populate a user interface to simultaneously identify multiple members of the group and items of content identified by submission of the queries.

5. The system of claim 1, wherein the instructions are further executable to provide a user interface configured to, as a result of selection of a content item identified for the group, provide for selection a set of members of the group and enable composition of an electronic message to the selected set of members of the group.

6. The system of claim 1, wherein the instructions are further executable to provide a user interface configured to, as a result of the member's selection of a content item identified for the group, provide the content item and enable communication about the content item with at least one other member of the group.

7. The system of claim 6, wherein the user interface is provided by transmitting a web page.

8. The system of claim 1, wherein the instructions are further executable to, as a result of selection of a content item, determine a set of members of the group related to the content item and enable communication to the set of members.

9. The system of claim 1, wherein the instructions are further executable to generate a search query based at least in part on the ancillary information to identify the instances of content.

10. The system of claim 1, wherein the instructions are further executable to obtain additional information about members of the group and update the search parameters according to the obtained additional information.

11. The system of claim 1, wherein the instructions are further executable to normalize identifiers of members of the group for use in search parameters.

12. The system of claim 1, wherein at least some of the queries are formatted as programmatic API calls.

13. The system of claim 1, wherein the instructions are further executable to assign unique identifiers to search result sets that identify the instances of content.

14. The system of claim 1, wherein the instructions are further executable to ensure that search result sets identifying the instances of content contain information about one or more group members.

15. The system of claim 1, wherein the instructions are further executable to organize instances of content into bins according to which member or members of the group are mentioned in the instances of content.

16. The system of claim 1, wherein the instructions are further executable to generate the queries to be submittable to different search engines with different formatting requirements.

17. The system of claim 1, wherein the instances of content are news stories.

18. The system of claim 1, wherein the instructions are further executable to selectively anonymize communications among group members.

19. The system of claim 1, wherein the instructions are further executable to provide an interface through which data about the group members is displayed with instances of content.

20. The system of claim 1, wherein the data is obtained contemporaneously from one or more other systems.

\* \* \* \* \*